(12) United States Patent
Rajkotia

(10) Patent No.: US 7,675,940 B2
(45) Date of Patent: Mar. 9, 2010

(54) METHOD AND SYSTEM FOR PROVIDING CROSS-LAYER QUALITY-OF-SERVICE FUNCTIONALITY IN A WIRELESS NETWORK

(75) Inventor: Purva R. Rajkotia, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1356 days.

(21) Appl. No.: 11/112,335

(22) Filed: Apr. 22, 2005

(65) Prior Publication Data

US 2005/0286438 A1 Dec. 29, 2005

Related U.S. Application Data

(60) Provisional application No. 60/583,481, filed on Jun. 28, 2004.

(51) Int. Cl.
- *G06F 15/173* (2006.01)
- *H04W 4/00* (2009.01)
- *H04J 3/16* (2006.01)
- *H04L 12/28* (2006.01)

(52) U.S. Cl. .................. 370/469; 370/328; 370/395.4; 709/233

(58) Field of Classification Search ................ 370/328, 370/469, 395.4; 709/233
See application file for complete search history.

(56) References Cited

U.S. PATENT DOCUMENTS

| | | | |
|---|---|---|---|
| 6,785,227 B1 * | 8/2004 | Lu et al. ..................... | 370/229 |
| 6,922,564 B2 * | 7/2005 | Witana ....................... | 370/235 |
| 2003/0103465 A1 * | 6/2003 | Counterman ................ | 370/252 |
| 2003/0204596 A1 * | 10/2003 | Yadav ........................ | 709/226 |
| 2004/0105415 A1 * | 6/2004 | Fujiwara et al. ............. | 370/338 |
| 2005/0047335 A1 * | 3/2005 | Cheng et al. ................ | 370/229 |

* cited by examiner

*Primary Examiner*—Vincent P Harper
*Assistant Examiner*—Marisol Figueroa

(57) ABSTRACT

A method for providing cross-layer quality-of-service (QoS) functionality in a wireless network is provided. The method includes obtaining QoS data from each layer of an application stack for a particular application. A QoS matrix is generated based on the obtained QoS data. Packet distribution for the particular application may then be prioritized based on the QoS matrix.

20 Claims, 4 Drawing Sheets

METHOD AND SYSTEM FOR PROVIDING CROSS-LAYER QUALITY-OF-SERVICE FUNCTIONALITY IN A WIRELESS NETWORK

CROSS-REFERENCE TO RELATED APPLICATION AND CLAIM OF PRIORITY

The present invention is related to that disclosed in U.S. Provisional Patent No. 60/583,481, filed Jun. 28, 2004, entitled "Cross Layer QoS Architecture." U.S. Provisional Patent No. 60/583,481 is assigned to the assignee of the present application. The subject matter disclosed in U.S. Provisional Patent No. 60/583,481 is hereby incorporated by reference into the present disclosure as if fully set forth herein. The present application hereby claims priority under 35 U.S.C. §119(e) to U.S. Provisional Patent No. 60/583,481.

TECHNICAL FIELD OF THE INVENTION

The present invention relates generally to wireless networks and, more specifically, to a method and system for providing cross-layer quality-of-service functionality in a wireless network.

BACKGROUND OF THE INVENTION

The use of cellular telephones and wireless networks has become increasingly widespread. As the use of cellular telephones has increased, the number and quality of additional features made available with the cellular telephones has also increased. For example, some mobile stations (e.g., cellular telephones) are able to provide quality-of-service (QoS) functionality under current wireless standards.

However, several unresolved issues associated with these standards include traffic category assignment, content-based policies, and hybrid networks. For traffic category assignment, the current standards do not define how the traffic categories are assigned. They may be assigned directly by the application or by another entity in the network, although an application update may be required. If the network is already QoS enabled, the proper traffic category may be assigned by mapping the upper layer QoS parameters. In general, an edge-oriented technique is more appropriate because it cannot take into account specific media related constraints.

For content-based policies, each packet may have a different level of importance with respect to the perceived quality within the same flow. In the case of MPEG2 video, for example, I frames are much more important than B frames and P frames in terms of perceived quality. Content-based differentiation may be important in high-multimedia content networks, such as home networks.

For hybrid networks, the deployment or upgrade of wireless networks requires a hardware substitution or a firmware update, depending on the manufacturer. During initial phases of deployment, the nodes that use different technologies may well be in the same network. Thus, this situation of having different technologies in the same network may exacerbate unfairness among the clients or terminals.

Therefore, there is a need in the art for improved wireless networks that resolve these issues. In particular, there is a need for a wireless network that is able to take into consideration all the layers in the application stack responsible for transmitting data in order to generate a QoS matrix based on QoS data in each of the layers such that a corresponding base station may implement cross-layer QoS functionality for prioritizing packets based on the QoS matrix.

SUMMARY OF THE INVENTION

In accordance with the present invention, a method and system for providing cross-layer quality-of-service (Qos) functionality in a wireless network are provided that substantially eliminate or reduce disadvantages and problems associated with conventional methods and systems.

To address the above-discussed deficiencies of the prior art, it is a primary object of the present invention to provide a method for providing cross-layer QoS functionality in a wireless network. According to an advantageous embodiment of the present invention, the method comprises obtaining QoS data from each layer of an application stack for a particular application. A QoS matrix is generated based on the obtained QoS data. Packet distribution for the particular application may then be prioritized based on the QoS matrix.

According to one embodiment of the present invention, the QoS matrix is sent to a base station associated with the particular application, and the base station is operable to prioritize the packet distribution for the particular application based on the QoS matrix.

According to another embodiment of the present invention, the QoS matrix is sent to a primary wireless quality provider.

According to still another embodiment of the present invention, at least one additional QoS matrix is received from at least one secondary wireless quality provider.

According to yet another embodiment of the present invention, a final QoS matrix is generated based on the QoS matrix and the at least one additional QoS matrix.

According to a further embodiment of the present invention, the final QoS matrix is sent to a base station associated with the particular application, and the base station is operable to prioritize the packet distribution for the particular application based on the final QoS matrix.

According to a still further embodiment of the present invention, a determination is made as to whether or not the QoS matrix has been requested and QoS data is obtained from each layer of the application stack for the particular application when the QoS matrix has been requested.

According to a yet further embodiment of the present invention, a determination is made as to whether or not an application change has occurred and QoS data is obtained from each layer of the application stack for the particular application when the application change has occurred.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the term "each" means every one of at least a subset of the identified items; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 5, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless network.

Figure 1:
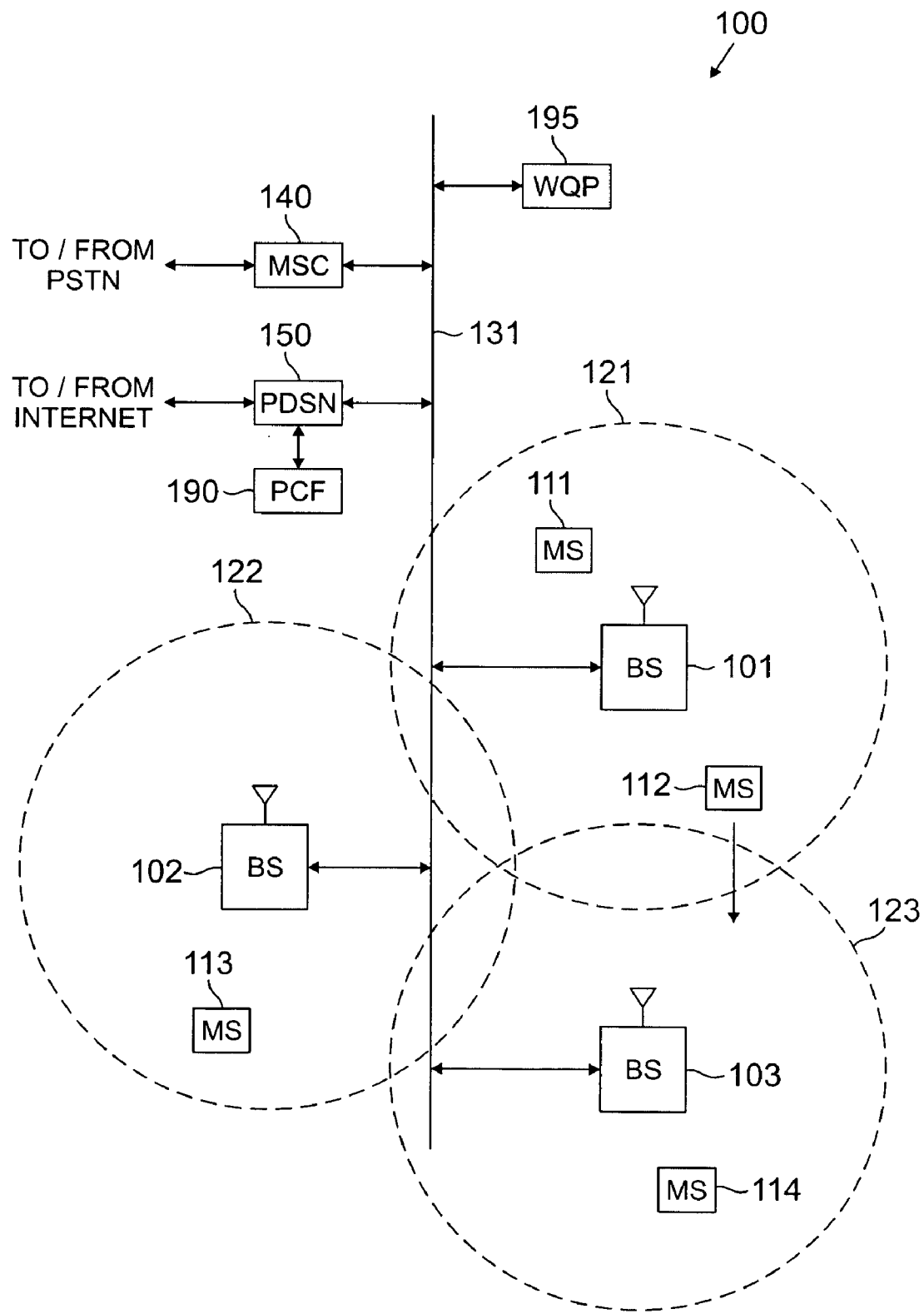
FIG. 1 illustrates an exemplary wireless network that is capable of providing cross-layer quality-of-service functionality according to the principles of the present invention.

FIG. 1 illustrates an exemplary wireless network 100 that is capable of providing cross-layer quality-of-service (QoS) functionality according to the principles of the present invention. Wireless network 100 comprises a plurality of cell sites 121-123, each containing one of the base stations, BS 101, BS 102, or BS 103. Base stations 101-103 communicate with a plurality of mobile stations (MS) 111-114 over code division multiple access (CDMA) channels according to, for example, the IS-2000 standard (i.e., CDMA2000). In an advantageous embodiment of the present invention, mobile stations 111-114 are capable of receiving data traffic and/or voice traffic on two or more CDMA channels simultaneously. Mobile stations 111-114 may be any suitable wireless devices (e.g., conventional cell phones, PCS handsets, personal digital assistant (PDA) handsets, portable computers, telemetry devices) that are capable of communicating with base stations 101-103 via wireless links.

The present invention is not limited to mobile devices. The present invention also encompasses other types of wireless access terminals, including fixed wireless terminals. For the sake of simplicity, only mobile stations are shown and discussed hereafter. However, it should be understood that the use of the term "mobile station" in the claims and in the description below is intended to encompass both truly mobile devices (e.g., cell phones, wireless laptops) and stationary wireless terminals (e.g., a machine monitor with wireless capability).

Dotted lines show the approximate boundaries of cell sites 121-123 in which base stations 101-103 are located. The cell sites are shown approximately circular for the purposes of illustration and explanation only. It should be clearly understood that the cell sites may have other irregular shapes, depending on the cell configuration selected and natural and man-made obstructions.

As is well known in the art, each of cell sites 121-123 is comprised of a plurality of sectors, where a directional antenna coupled to the base station illuminates each sector. The embodiment of FIG. 1 illustrates the base station in the center of the cell. Alternate embodiments may position the directional antennas in corners of the sectors. The system of the present invention is not limited to any particular cell site configuration.

In one embodiment of the present invention, each of BS 101, BS 102 and BS 103 comprises a base station controller (BSC) and one or more base transceiver subsystem(s) (BTS). Base station controllers and base transceiver subsystems are well known to those skilled in the art. A base station controller is a device that manages wireless communications resources, including the base transceiver subsystems, for specified cells within a wireless communications network. A base transceiver subsystem comprises the RF transceivers, antennas, and other electrical equipment located in each cell site. This equipment may include air conditioning units, heating units, electrical supplies, telephone line interfaces and RF transmitters and RF receivers. For the purpose of simplicity and clarity in explaining the operation of the present invention, the base transceiver subsystems in each of cells 121, 122 and 123 and the base station controller associated with each base transceiver subsystem are collectively represented by BS 101, BS 102 and BS 103, respectively.

BS 101, BS 102 and BS 103 transfer voice and data signals between each other and the public switched telephone network (PSTN) (not shown) via communication line 131 and mobile switching center (MSC) 140. BS 101, BS 102 and BS 103 also transfer data signals, such as packet data, with the Internet (not shown) via communication line 131 and packet data server node (PDSN) 150. Packet control function (PCF) unit 190 controls the flow of data packets between base stations 101-103 and PDSN 150. PCF unit 190 may be implemented as part of PDSN 150, as part of MSC 140, or as a stand-alone device that communicates with PDSN 150, as shown in FIG. 1. Line 131 also provides the connection path for control signals transmitted between MSC 140 and BS 101, BS 102 and BS 103 that establish connections for voice and data circuits between MSC 140 and BS 101, BS 102 and BS 103.

Communication line 131 may be any suitable connection means, including a T1 line, a T3 line, a fiber optic link, a network packet data backbone connection, or any other type of data connection. Line 131 links each vocoder in the BSC with switch elements in MSC 140. The connections on line 131 may transmit analog voice signals or digital voice signals in pulse code modulated (PCM) format, Internet Protocol (IP) format, asynchronous transfer mode (ATM) format, or the like.

MSC 140 is a switching device that provides services and coordination between the subscribers in a wireless network and external networks, such as the PSTN or Internet. MSC 140 is well known to those skilled in the art. In some embodiments of the present invention, communications line 131 may be several different data links where each data link couples one of BS 101, BS 102, or BS 103 to MSC 140.

In the exemplary wireless network 100, MS 111 is located in cell site 121 and is in communication with BS 101. MS 113 is located in cell site 122 and is in communication with BS 102. MS 114 is located in cell site 123 and is in communication with BS 103. MS 112 is also located close to the edge of cell site 123 and is moving in the direction of cell site 123, as indicated by the direction arrow proximate MS 112. At some point, as MS 112 moves into cell site 123 and out of cell site 121, a hand-off will occur.

For the illustrated embodiment, wireless network 100 comprises a wireless quality provider (WQP) 195 as a separate component. However, as described in more detail below in connection with FIG. 4, WQP 195 may be integrated into one or more components of wireless network, such as PDSN 150 and/or additional servers (not shown in FIG. 1).

WQP 195 is operable to generate a QoS matrix for each base station 101-103 based on each layer of the application stack for a particular application being executed by base station 101-103 for a mobile station 111-114. For example, for the OSI model, WQP 195 is operable to generate a QoS matrix based on the physical, data link, network, transport, session, presentation, and application layers. WQP 195 is also operable to provide the QoS matrix to the appropriate base station 101-103, each of which is operable to implement the policies within the QoS matrix for the corresponding application. In this way, resource allocation may be optimized without over-provisioning the system.

Figure 2:
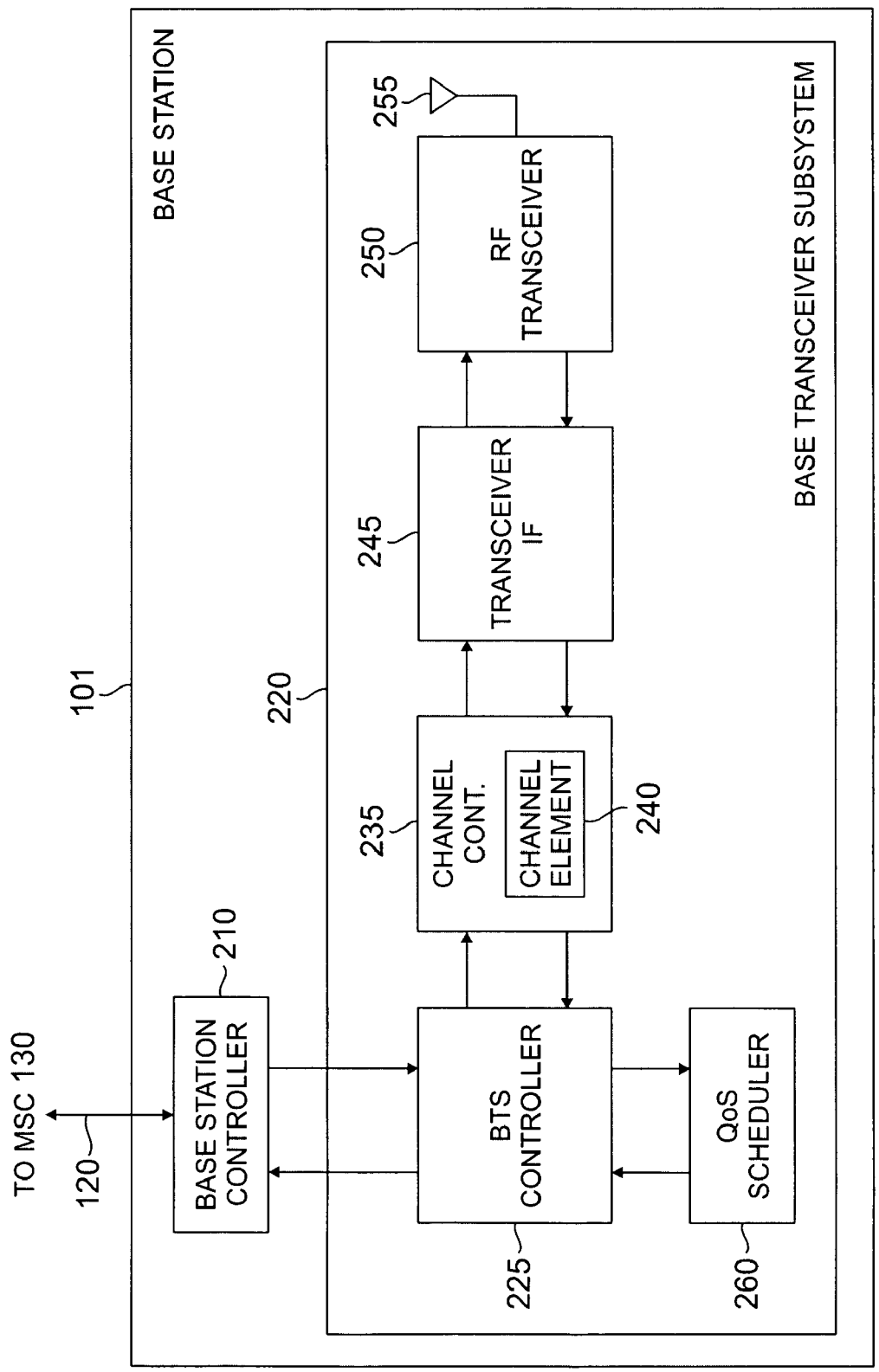
FIG. 2 illustrates the base station of FIG. 1 in greater detail according to the principles of the present invention.

FIG. 2 illustrates base station (BS) 101 in greater detail according to the principles of the present invention. BS 101 comprises base station controller (BSC) 210 and at least one base transceiver subsystem (BTS) 220, as previously described in connection with FIG. 1. Base station controller 210 manages the resources in cell site 121, including base transceiver subsystem 220. According to one embodiment, base transceiver subsystem 220 comprises base transceiver subsystem (BTS) controller 225, channel controller 235 (which may comprise at least one channel element 240), transceiver interface (IF) 245, radiofrequency (RF) transceiver unit 250, antenna array 255, and QoS scheduler 260.

BTS controller 225 may comprise processing circuitry and memory capable of executing an operating program that controls the overall operation of base transceiver subsystem 220 and communicates with base station controller 210. Under normal conditions, BTS controller 225 directs the operation of channel controller 235, which may comprise a number of channel elements, such as channel element 240, that are each operable to perform bidirectional communication in the forward channel and the reverse channel. A "forward channel" refers to outbound signals from the base station 101 to mobile stations 111 and 112 and a "reverse channel" refers to inbound signals from mobile stations 111 and 112 to base station 101. Transceiver IF 245 transfers bidirectional channel signals between channel controller 240 and RF transceiver unit 250.

Antenna array 255 transmits forward channel signals received from RF transceiver unit 250 to mobile stations in the coverage area of base station 101. Antenna array 255 is also operable to send to RF transceiver unit 250 reverse channel signals received from mobile stations in the coverage area of the base station 101. According to one embodiment of the present invention, antenna array 255 comprises a multi-sector antenna, such as a three-sector antenna in which each antenna sector is responsible for transmitting and receiving in a coverage area corresponding to an arc of approximately 1200. Additionally, RF transceiver unit 250 may comprise an antenna selection unit to select among different antennas in antenna array 255 during both transmit and receive operations.

For the illustrated embodiment, QoS scheduler 260 is operable to receive the QoS matrix from WQP 195 and to implement the policies within the QoS matrix for the data streams received at base station 101. For example, according to one embodiment, QoS scheduler 260 determines whether or not a policy is available in a QoS matrix for a particular packet received at base station 101. If there is such a policy, QoS scheduler 260 prompts base station 101 to forward the packet using that policy. If no such policy is found, base station 101 may transmit the packet according to any QoS characteristics visible to base station 101. In addition, QoS scheduler 260 may be operable to send a QoS matrix request to WQP 195 in order to prompt WQP 195 to provide a QoS matrix to base station 101 for a particular application.

Figure 3:
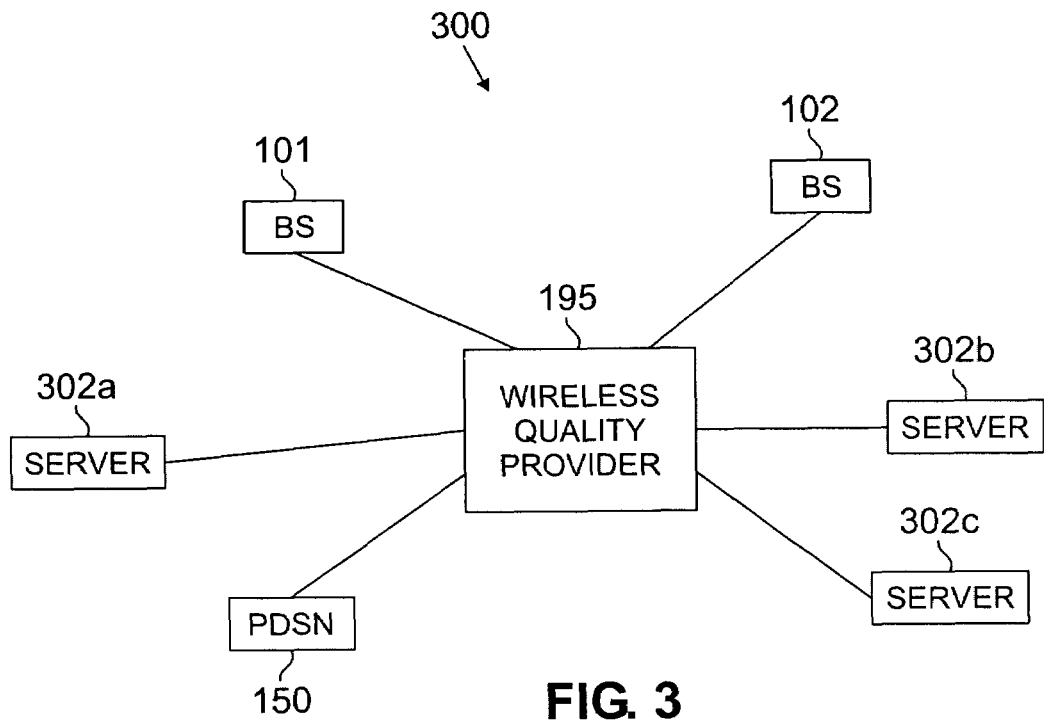
FIG. 3 illustrates portions of the wireless network of FIG. 1 arranged in a centralized architecture according to the principles of the present invention.

FIG. 3 illustrates portions of wireless network 100 arranged in a centralized architecture 300 according to the principles of the present invention. According to this embodiment, centralized architecture 300 of wireless network 100 comprises WQP 195 a separate component, which is coupled to base station 101, base station 102, PDSN 150, and a plurality of servers 302a-c. It will be understood that WQP 195 may be coupled to other suitable components of wireless network 100, such as additional base stations and servers, for example, that are not included in FIG. 3 for simplicity.

In operation, according to an advantageous embodiment of the present invention, when one of base station 101 or 102 initiates an application or requests a QoS matrix, WQP 195 queries each layer of the corresponding application stack. For example, using the OSI model, WQP 195 queries the physical, data link, network, transport, session, presentation, and application layers of the application stack. After obtaining the QoS data from each of the layers, WQP 195 generates a QoS matrix for base station 101 or 102 based on the obtained QoS data and provides the QoS matrix to base station 101 or 102.

Base station 101 or 102 then implements the policies within the QoS matrix when forwarding packets for that application. Thus, base station 101 or 102 prioritizes the packets for the application based on the QoS data in the QoS matrix. In this way, base stations 101 and 102 may efficiently optimize resources based on the QoS data provided in each layer of the application stack without over-provisioning the system.

Figure 4:
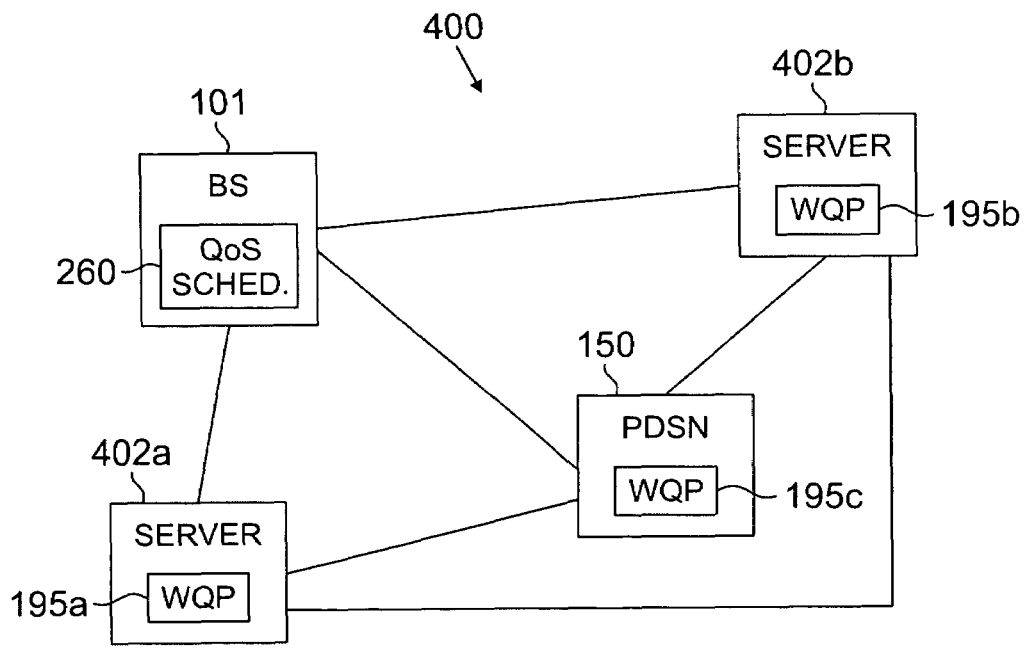
FIG. 4 illustrates portions of the wireless network of FIG. 1 arranged in a decentralized architecture according to the principles of the present invention.

FIG. 4 illustrates portions of wireless network 100 arranged in a decentralized architecture 400 according to the principles of the present invention. According to this embodiment, decentralized architecture 400 of wireless network 100 comprises base station 101, PDSN 150, and a plurality of servers 402a-b. It will be understood that decentralized architecture 400 may comprise other suitable components of wireless network 100, such as additional base stations and servers, for example, that are not included in FIG. 4 for simplicity.

Decentralized architecture 400 does not comprise WQP 195 as a separate component. Instead, WQP 195 is implemented in PDSN 150 and one or more servers 402a-b. For one embodiment, WQP 195a, WQP 195b, and WQP 195c may each comprise the full functionality of WQP 195, as described above in connection with FIGS. 1 and 3. Alternatively, the WQPs 195a-c of decentralized architecture 400 may collectively implement the previously described WQP 195. It will be understood that any additional servers other than servers 402a-b included in decentralized architecture 400 may each comprise an integrated WQP.

For the embodiment in which each of WQP 195a, WQP 195b, and WQP 195c comprises the full functionality of WQP 195, one of these WQPs 195a, 195b or 195c may be designated as a primary WQP while the remaining ones are designated as secondary WQPs. The primary WQP is operable to generate a final QoS matrix for base station 101 based on QoS matrices generated by secondary WQPs. As another alternative, QoS scheduler 260 of base station 101 may be operable to generate the final QoS matrix based on QoS matrices received from one or more WQPs 195a-c.

In operation, according to an advantageous embodiment of the present invention, when base station 101 initiates an application or requests a QoS matrix, one or more WQPs 195a-c query each layer of the corresponding application stack, such as the physical, data link, network, transport, session, presentation, and application layers. For example, if server 402a is servicing the application for base station 101, WQPs 195a and 195c may query the layers. However, it will be understood that other combinations of WQPs 195a-c may be involved in querying the layers without departing from the scope of the present invention.

After obtaining the QoS data from each of the layers, WQPs 195a and 195c each generate a QoS matrix for base station 101 based on the obtained QoS data. These QoS matrices may then be provided to base station 101, after which base station 101 generates a final QoS matrix for the application based on the received QoS matrices. Alternatively, a primary WQP, such as WQP 195c, for example, may generate the final QoS matrix based on the QoS matrices and provide the final QoS matrix to base station 101.

Base station 101 then implements the policies within the final QoS matrix. Thus, base station 101 prioritizes the packets for the application based on the QoS data in the final QoS matrix. In this way, base station 101 may efficiently optimize resources based on the QoS data provided in each layer of the application stack without over-provisioning the system.

Figure 5:
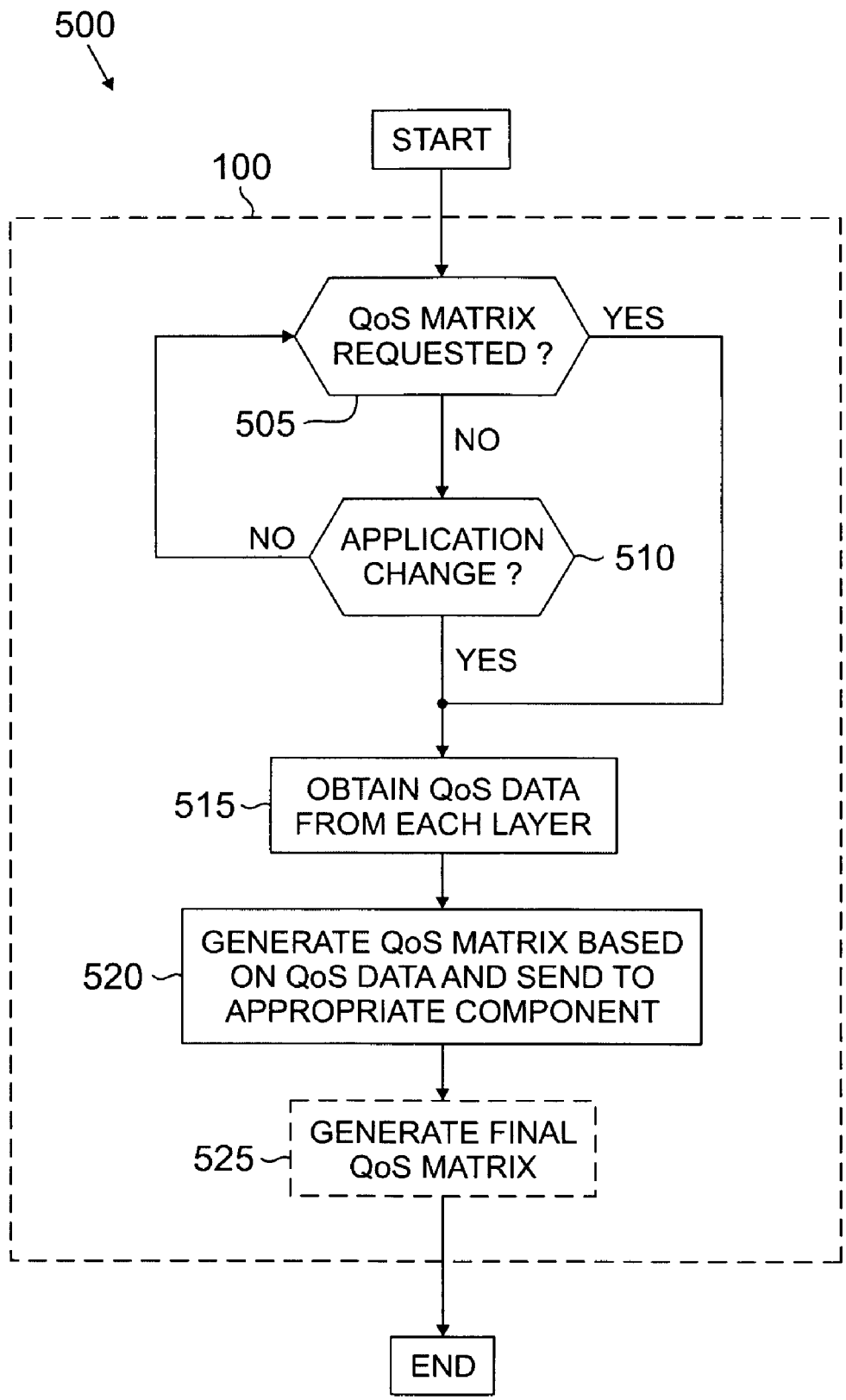
FIG. 5 is a flow diagram illustrating a method for providing cross-layer quality-of-service functionality in the wireless network of FIG. 3 or 4 according to the principles of the present invention.

FIG. 5 is a flow diagram illustrating a method 500 for providing cross-layer quality-of-service functionality in either centralized architecture 300 or decentralized architecture 400 of wireless network 100 according to the principles of the present invention. For the purposes of simplicity and clarity in explaining the operation of the present invention, it shall be assumed in the following example that base station (BS) 101 of wireless network 100 provides service for mobile station (MS) 111 and MS 112. However, the descriptions that follow also apply to the remaining base stations and mobile stations in wireless network 100. In addition, while the following description refers to WQP 195, it will be understood that one or more of WQPs 195a-c may perform the same functions as WQP 195.

Initially, WQP 195 determines whether BS 101 has requested a QoS matrix (process step 505) or whether there has been a change in which application is being executed by MS 111 or MS 112 (process step 510). If no QoS matrix has been requested and no application change has occurred, the method follows the NO branches and continues until one of these conditions is satisfied.

Once a QoS matrix is requested or an application change occurs, the method follows one of the YES branches and WQP 195 obtains QoS data from each layer of the application stack that corresponds to the QoS matrix request or new application (process step 515). For example, WQP 195 may obtain the QoS data by querying the physical, data link, network, transport, session, presentation, and application layers of the application stack.

WQP 195 then generates a QoS matrix based on the QoS data obtained from the layers and sends the QoS matrix to the appropriate component of wireless network 100 (process step 520). For example, for the embodiment using centralized architecture 300, WQP 195 provides the QoS matrix to BS 101. For the embodiment using decentralized architecture 400, WQPs 195a, 195b and/or 195c may each provide a QoS matrix to BS 101 or to a primary WQP.

Also for the embodiment using decentralized architecture 400, BS 101 or a primary WQP may generate a final QoS matrix (optional process step 525) based on the QoS matrix or matrices received from other components. In this manner, QoS scheduler 260 of BS 101 is able to prioritize packet distribution from BS 101 more efficiently without needing to over-provision the system by implementing cross-layer QoS functionality in accordance with the policies within the QoS matrix.

Although the present invention has been described with an exemplary embodiment, various changes and modifications may be suggested to one skilled in the art. It is intended that the present invention encompass such changes and modifications as fall within the scope of the appended claims.

What is claimed is:

1. For use in a wireless network capable of communicating with a plurality of mobile stations in a coverage area of the wireless network, a method of providing cross-layer quality-of-service (QoS) functionality in the wireless network, the method comprising the steps of:
    obtaining QoS data from each layer of an application stack for a particular application;
    generating a QoS matrix based on the obtained QoS data, packet distribution for the particular application operable to be prioritized based on the QoS matrix; and
    receiving at least one additional QoS matrix from at least one secondary wireless quality provider wherein the QoS scheduler is further operable to receive a plurality of QoS matrices from a plurality of wireless quality providers, to generate a final QoS matrix based on the plurality of QoS matrices, and to implement policies within the final QoS matrix for packets received at the base station.

2. The method as set forth in claim 1, further comprising the step of sending the QoS matrix to a base station associated with the particular application, the base station operable to prioritize the packet distribution for the particular application based on the QoS matrix.

3. The method as set forth in claim 1, further comprising the step of sending the QoS matrix to a primary wireless quality provider.

4. The method as set forth in claim 1, further comprising the step of generating a final QoS matrix based on the QoS matrix and the at least one two additional QoS matrices.

5. The method as set forth in claim 4, further comprising the step of sending the final QoS matrix to a base station associated with the particular application, the base station operable to prioritize the packet distribution for the particular application based on the final QoS matrix.

6. The method as set forth in claim 1, further comprising the steps of:
    determining whether the QoS matrix has been requested; and
    obtaining QoS data from each layer of the application stack for the particular application comprising obtaining QoS data from each layer of the application stack for the particular application when the QoS matrix has been requested.

7. The method as set forth in claim 1, further comprising the steps of:
    determining whether an application change has occurred; and
    obtaining QoS data from each layer of the application stack for the particular application comprising obtaining QoS data from each layer of the application stack for the particular application when the application change has occurred.

8. For use in a wireless network capable of communicating with a plurality of mobile stations in a coverage area of the wireless network, a wireless quality provider for providing cross-layer quality-of-service (QoS) functionality in the wireless network, the wireless quality provider operable to obtain QoS data from each layer of an application stack for a particular application and to generate a QoS matrix based on the obtained QoS data, packet distribution for the particular application operable to be prioritized based on the QoS matrix, and the wireless quality provider is further operable to receive at least one additional QoS matrix from at least one secondary wireless quality provider wherein the QoS scheduler is further operable to receive a plurality of QoS matrices from a plurality of wireless quality providers, to generate a final QoS matrix based on the plurality of QoS matrices, and to implement policies within the final QoS matrix for packets received at the base station.

9. The wireless quality provider as set forth in claim 8, the wireless quality provider further operable to send the QoS matrix to a base station associated with the particular application, the base station operable to prioritize the packet distribution for the particular application based on the QoS matrix.

10. The wireless quality provider as set forth in claim 8, the wireless quality provider comprising a secondary wireless quality provider and further operable to send the QoS matrix to a primary wireless quality provider.

11. The wireless quality provider as set forth in claim 8, the wireless quality provider further operable to generate a final QoS matrix based on the QoS matrix and the at least two additional QoS matricies.

12. The wireless quality provider as set forth in claim 11, the wireless quality provider further operable to send the final QoS matrix to a base station associated with the particular application, the base station operable to prioritize the packet distribution for the particular application based on the final QoS matrix.

13. The wireless quality provider as set forth in claim 8, the wireless quality provider further operable to determine whether the QoS matrix has been requested and to obtain QoS data from each layer of the application stack for the particular application when the QoS matrix has been requested.

14. The wireless quality provider as set forth in claim 8, the wireless quality provider further operable to determine whether an application change has occurred and to obtain QoS data from each layer of the application stack for the particular application when the application change has occurred.

15. For use in a wireless network capable of communicating with a plurality of mobile stations in a coverage area of the wireless network, a base station capable of providing cross-layer quality-of-service (QoS) functionality in the wireless network, the base station comprising a QoS scheduler operable to receive a QoS matrix from a wireless quality provider and to implement policies within the QoS matrix for packets received at the base station, wherein the QoS matrix includes QoS data from each layer of an application stack for a particular application and wherein the wireless quality provider is further operable to receive at least one additional QoS matrix from at least one secondary wireless quality provider wherein the QoS scheduler is further operable to receive a plurality of QoS matrices from a plurality of wireless quality providers, to generate a final QoS matrix based on the plurality of QoS matrices, and to implement policies within the final QoS matrix for packets received at the base station.

16. The base station as set forth in claim 15, the QoS scheduler operable to implement policies within the QoS matrix by prioritizing packets distributed by the base station based on the QoS matrix when a policy within the QoS matrix is associated with the packets.

17. The base station as set forth in claim 15, the QoS scheduler further operable to send a QoS matrix request to the wireless quality provider to prompt the wireless quality provider to provide the QoS matrix to the base station.

18. The base station as set forth in claim 15 further operable to generate a final QoS matrix based on the QoS matrix and the at least two additional QoS matrices.

19. The base station as set forth in claim 18 further operable to send the final QoS matrix to a second base station associated with the particular application, the second base station operable to prioritize the packet distribution for the particular application based on the final QoS matrix.

20. The base station as set forth in claim 15 further operable to determine whether the QoS matrix has been requested and to obtain QoS data from each layer of the application stack for the particular application when the QoS matrix has been requested.

* * * * *